Figure 1:
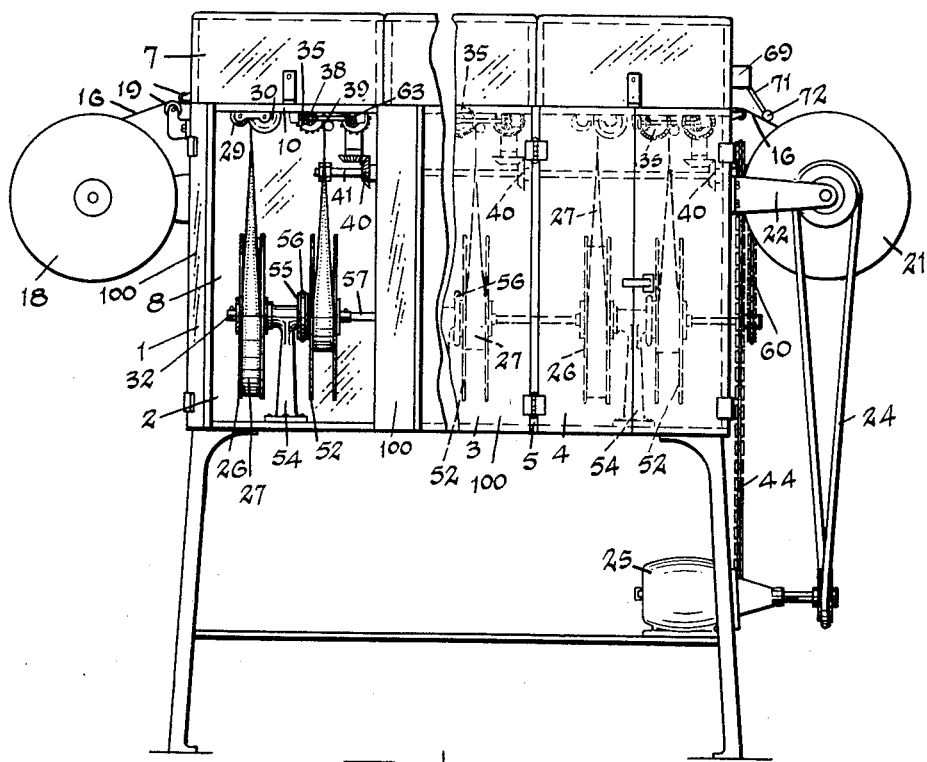

March 13, 1934.   R. C. WAGNER   1,951,299
MULTIPLE FILM PRINTING MACHINE
Filed Dec. 21, 1931   2 Sheets-Sheet 1

Inventor
Robert C. Wagner
By Faust F. Crampton
Attorney

March 13, 1934.  R. C. WAGNER  1,951,299
MULTIPLE FILM PRINTING MACHINE
Filed Dec. 21, 1931   2 Sheets-Sheet 2

Inventor
Robert C. Wagner
By Faust G. Crampton
Attorney

Patented Mar. 13, 1934

1,951,299

UNITED STATES PATENT OFFICE 1,951,299

MULTIPLE FILM PRINTING MACHINE

Robert C. Wagner, Toledo, Ohio, assignor of one-half to Roe Cochran, Erie, Mich.

Application December 21, 1931, Serial No. 582,281

4 Claims. (Cl. 95—75)

My invention relates to machines for printing a plurality of film copies or positives from a master negative film. The invention particularly relates to machines in which a master film may be moved so as to successively print a plurality of raw films during the passage of the master or negative film through the machine in such a manner as to provide economy of space wherein a large number of raw films may be printed.

The invention has for its particular object to provide a machine having a plurality of chambers in each of which a supply of raw film may be located and moved from reels extending transverse the minor dimension of chambers so as to receive impressions produced by the active rays of light which penetrate a single master or negative film to sequentially reproduce on each of the plurality of raw films the pictures of the master film during a single reeling of the master film with a limited extension of unwound master film. The invention provides a machine for directing the negative film under a light or lamp in each of the chambers and means for registering the sensitive or raw films with the negative or master film and contiguous to its under surface and means that engage the film to compensate for stretching or shrinkage of the master film while being exposed to light in conjunction with the raw film. The invention provides means, controlled by portions of the master film, for varying the intensity of the light of the printing lamps so as to obtain desired and varied effects of clarity and illusion on the completed positive films.

The invention also provides a means, controlled by the master film, for automatically indicating the complete exposure of the plurality of sensitive films and at the same time stopping the machine.

The invention consists in other advantages which will appear from the following description and upon examination of the drawings. Structures containing the invention may partake of different forms and may be varied in their details and still embody the invention. To illustrate a practical application of the invention, I have selected a multiple film printing machine embodying the invention as an example of the various structures and details thereof that contain the invention and shall describe the selected structure hereinafter, it being understood that variations may be made without departing from the spirit of the invention. The particular structure selected is shown in the accompanying drawings.

Figure 2:
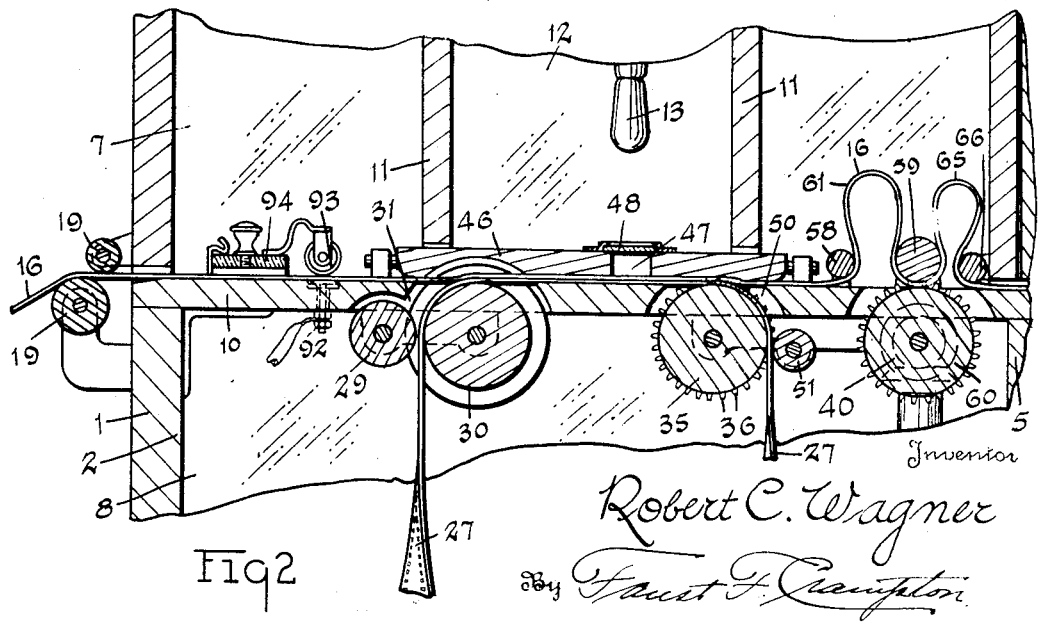
Figure 3:
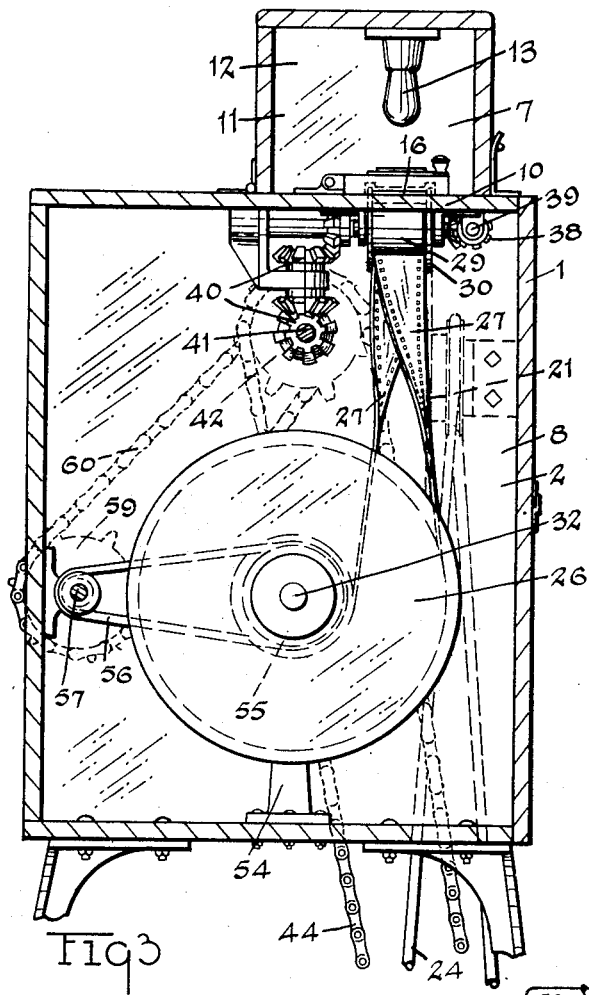
Figure 5:
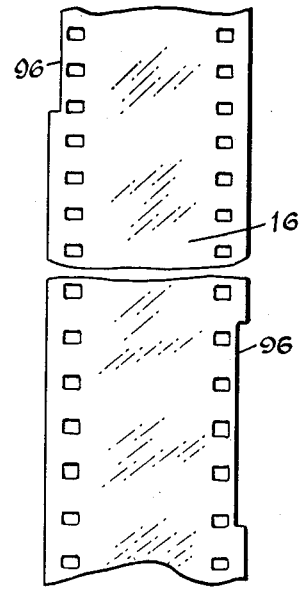
Figure 4:
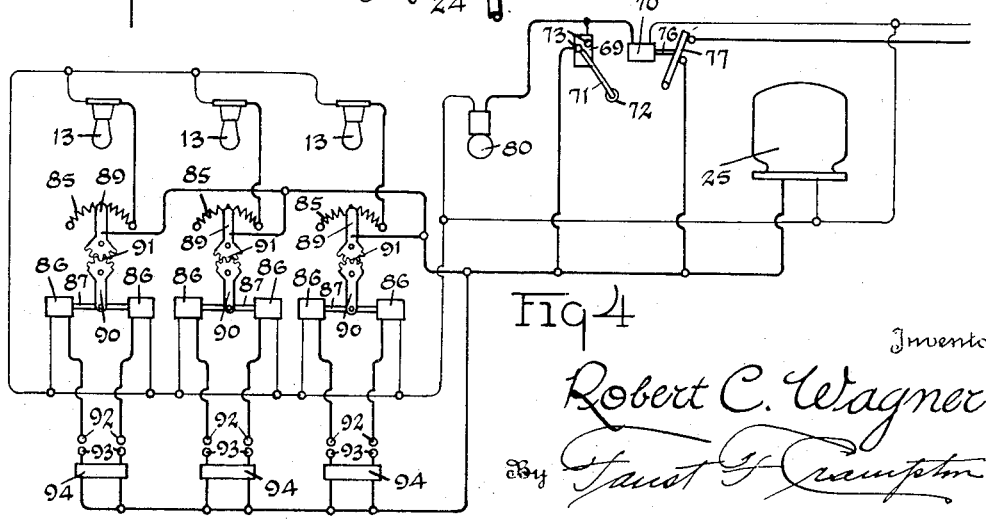

Fig. 1 of the accompanying drawings illustrates a side view of the machine, the doors of one of the chambers being open to show the interior. Fig. 2 illustrates an enlarged detailed view of one of the printing chambers. Fig. 3 illustrates a transverse view taken through the machine. Fig. 4 illustrates a diagram of the electrical circuit for operating the machine. Fig. 5 illustrates a view of a portion of the master film.

The printing machine, shown in the accompanying drawings for purposes of illustration, has a plurality of chambers in each of which printing lamps or bulbs are located. The printing lamps direct actinic rays of light through successive portions of a master or negative film which is directed beneath the lamps by a series of rollers and sprockets. A supply of raw film may be located within each of the chambers and delivered into the vicinity of the lamps by the sprockets at the same speed as the master film, to coordinate the periods of their exposure to the lamps. A plurality of winding reels are located so as to receive the exposed portions of the positive films immediately thereafter. The winding reels may be geared or connected to a common driving source so that the speed of winding of the exposed film will be at the same rate of speed as those portions of the films passing beneath the lamp. In order to economize space the winding and supply reels for the positive films are supported in planes transverse to the line of movement of the master film to permit the location of a relatively large number of reels within a short distance or with least unwound footage of the master film. Switches, which are controlled by portions of the master film, are connected with solenoid operated rheostats for controlling the electrical energy flowing through the printing lamps to vary the intensity of the light rays and their effect on the sensitive film. The machine also has a switch, operated by the master film, which breaks the circuit through the motor of the machine following the passage of the master film through the last printing chamber.

The operating portions of the machine, as particularly shown in the drawings, are enclosed within a cabinet 1. The cabinet may be built of wood and suitably sealed to prevent penetration of the outside light from pre-exposing or otherwise endangering the sensitive films located in the cabinet.

The cabinet 1 is divided into a plurality of compartments, such as the compartments 2, 3, and 4, by partitions 5. Each of the compartments are sub-divided into upper chambers 7 and lower chambers 8 by a partition 10, which extends the entire length of the cabinet. The upper chambers 7 may be provided with suitable partitions 11 to form printing compartments 12 in which the lamps or bulbs 13 may be located. The partition 10 provides a supporting surface over which a film 16 may be moved into the compartments 12 and directed under the printing bulbs 13 which are located in the compartments 12. The film 16 is delivered from a suitable supply reel 18 and directed onto the surface of the partition 10 by rollers 19 supported on the wall of the cabinet 1. Thus, the film 16 will be moved through the printing compartments 12 on the surface of the partition 10 from which it may be rewound at the opposite end of the cabinet on a receiving reel 21, which is supported by a bracket 22 on the wall of the cabinet 1. The receiving reel 21 is caused to rotate and rewind the film 16 by a belt 24 which is connected to a suitable source of power, such as the motor 25.

In order to obtain multiple printing of the film 16 on a plurality of sensitive raw films as it is moved through each of the compartments 12, a reel 26 of sensitive film 27, on which positive copies may be obtained, is supported in each of the lower compartments 8 of the chambers 2, 3, and 4. The reels 26 may be rotatably mounted on shafts 32 and so as to be quickly replaced or substituted by subsequent reels of raw film. In order to locate a greater number of reels of sensitive film in position so as to be printed from the master in a short movement of the master films, the shafts 32 extend at right angles to the line of movement of the master film and thus permits of a high efficiency of space occupancy in the cabinet. Each of the films 27, drawn from the reels 26, is directed by rollers 29 and 30 through an opening 31 formed in the partition 10, and into the upper compartment 7 of the chambers beneath the film 16 so that, as the films 16 and 27 pass through the printing compartment 12, the raw film will be exposed to the light of the printing lamps 13 according to the degree in which the light rays penetrate the film 16.

In order to cause definite registration of the master film 16 with the film 27 and to prevent shrinkage or stretching of one or the other of the films during the printing operation, sprockets 35, having teeth 36, engage regularly spaced openings formed in the edge portions of the films 16 and 27. Each of the sprockets 35 is rotated by a pinion 38 and a shaft 39 which are connected through a suitable train of pinion gears 40 to a drive shaft 41. The drive shaft 41 is rotated by a sprocket 42 which may be connected to the motor 25 by a sprocket chain 44. Thus, the films 16 and 27 will be moved through the printing compartments 12 and under the lamps 13 at the same speed and in registered relationship with each other. If desired, a suitable plate 46 may be provided in each of the printing compartments 12 to cover the films, prior to their exposure to the lamps 13, and to maintain their contacting surfaces contiguous to one another during the period of exposure or printing.

Each plate 46 is preferably formed of metal having a highly polished surface to reduce the friction of the films passing under the plate. In order to expose only those portions of the films passing directly beneath the lamp 13, enabling the use of only those rays of light which move at right angles to the films 16 and 27 to penetrate the master film 16, each plate 46 has a suitable opening 47, the center of which is located in line with the vertical axes of the lamps 13. Each of the openings 47 may have a suitable diffusing glass 48 which tends to diffuse the light and protect those portions of the films passing beneath the opening from the direct radiant heat and light rays of the lamps, such as would tend to cause contraction of, or other deleterious effects on the films.

Each of the films 27, having been exposed to the transfer of light through the film 16, is guided from the sprockets 35 through an opening 50, formed in the partition 10, by a roller 51 and to a receiving or rewinding reel 52. Each of the reels 52 is rotatably supported on the shafts 32 which supports the supply reels 26. The shafts 32 may be rotatably mounted in suitable brackets 54 supported by the cabinet. A pulley wheel 55 is keyed to each of the reels 52 and is mounted about the shaft 32. The reels 52 and pulley wheels 55 in each of the compartments 2, 3, and 4, may be caused to rotate by belts 56 which are driven from a common line shaft 57. The line shaft 57 is suitably supported on the wall of the cabinet and driven by a sprocket chain 60. Thus, the rotation of each of the reels 52 to wind up the exposed portions of the films 27 will be controlled, and at the same speed, by the rotation of the drive shaft 41.

In order to prevent breaking or tearing of the master film 16 by reason of its shrinkage or from becoming loosened, due to stretching, the film 16 is received from the sprocket 35 by a roller 58 and a compensating roller 59 and sprocket 60. The film is slacked or looped, preferably in that portion intermediate the roller 58 and the sprocket 60, as at 61, so that if there be any shrinkage in that portion of the film, the taut condition resulting therefrom will be alleviated by permitting the shrinkage to take up the looped or slacked portion of the film. The sprocket 60 may be driven by a suitable pinion 63, supported on the shaft 39, thereby rotating the sprockets 60 at the same rate of speed as the sprockets 35 are rotated. Thus, if any stretching exists in the master film 16, particularly in that portion which has not yet been engaged by the compensating roller 59 and sprocket 60, it will be taken up by the looped portion 61 and the film 16 engaged by the sprocket 60 will pass into the following compartment in the same measured amount as is engaged by the sprocket 35. The compensating roller 59 and sprocket 60, therefore, tend to measure the master film as it is moved through the various printing compartments. The film 16 also has looped portions on the opposite side of the sprocket 60 intermediate the roller 59 and a guide roller 66, as at 65, which tends to reduce any taut condition existing in the portion of the film which has passed the sprocket 60. The film is guided by the guide rollers 66 into the next printing compartment 12. Thus, it will be seen that if any shrinkage or stretching exists in the master film 16 on either side of the compensating sprocket 60, the existent condition will be immediately relieved by compensation from or to the looped portions 61 and 65.

In order that the operation of the machine may be stopped at the completion of the passage of the film 16 through the various printing compartments, a suitable switch 69, supported on the wall of the cabinet 1, is connected in circuit with a solenoid 70. An arm 71 of the switch may be provided with a suitable roller 72 which is adapted to ride on the surface of the film 16 and be supported by the tension of the film so as to maintain the contacts 73 of the switch in an open position. When an end of the film has passed through the compensating sprocket 60 in the last compartment, such as the compartment 4, the weight of the switch arm 70 will draw the loosened film from the cabinet and move one of the contacts 73 so as to close the circuit of the solenoid 70 through the switch 69. The solenoid 70 is provided with a movable core 76 which is connected to a switch arm 77. The switch arm 77 is connected in the circuit of the motor 25, and upon operation of the solenoid 70, the circuit through the motor 70 will be broken. If desired, a suitable indicating means, such as the bell 80, may be connected in the circuit so as to give momentary warning that the printing operation has been completed. Thus, the circuit of the motor 25 will be controlled by the switch 69 which is actuated by the master film 16 to cause cessation of the motor's operation as when a broken end of the film is drawn from the machine by the weight of the switch arm 71 or when the master film has been completely drawn through the entire machine.

In order to provide means for varying the intensity of the light produced by the printing lamps 13, variations in intensity of light being controlled by the master film 16, the printing lamps 13 are connected in circuit with rheostats 85, each of which is operated by a pair of solenoids 86. Each of the pair of solenoids 86 have movable cores 87 that are operatively connected to the movable contacts 89 of the rheostats 85 by a pivoted arm 90 and a segmental gear 91. Thus, when one of the solenoids 85 is energized, the movable contact 89 will be actuated by the core 87 of the solenoid to increase or decrease, depending on which of the solenoids is energized, the resistance to the flow of electrical current to the lamps 13. One of each of the solenoids 85 are connected in circuit with one of each of a pair of contacts 92.

The contacts 92 may be located on the partition 10, being suitably insulated therefrom, and a pair of spring contacts 93 are adapted to make contact with the contacts 92 when permitted by controlling portions of the master film 16. The spring contacts 93 are supported above the film 16 by a suitable insulated block 94 so as to resiliently press against and ride on the surface of the edges of the film. In order to permit contact of one of the contacts 93 with one of the contacts 92 so as to operate the rheostats 85 to increase or decrease the electrical energy passing through the lamps 13, the film 16 may be provided with elongated notches 96 in the edge portions of the film, through which one or the other of the spring contacts 93 may extend to make contact with a contact 92 to energize one of the solenoids 85 for as long a period as it takes for the passage of one of the elongated notches 96 beneath the contact 93. The edges of the film may thus be notched at portions where it is desired to cause variation of the intensity of the light to effect the sensitive film 27 and to obtain varied effects of light penetration and illusion on the film 27.

To facilitate insertion of the sensitive film, or removal of the exposed film, the chambers 2, 3, and 4 may be provided at one side with doors 100. The master film may be located in the various portions of the machine, subsequent to its operation, by lifting the insulated blocks 94 and the plates 46 about hinges provided therefor. The master film 16 may thus be threaded or located through the entire machine.

I claim:

1. In a film printing machine for reproducing film copy strip from a master film strip, a cabinet having a compartment, a lamp located in the compartment, the master film strip having a plurality of indented edge portions of predetermined length and re-occurrence, a pair of switches, one of the pair of switches located proximate to one edge of the master film strip and the other of the pair of switches located proximate to the other edge of the master film strip, means for moving the edge of the master film strip between the contacts of the said pair of switches, a pair of solenoids, one of the pair of solenoids connected to one of the pair of switches and the other of the pair of switches connected to the other of the pair of solenoids, the pair of solenoids having a common armature, a rheostat connected in series with the lamp and having a movable contact connected to the said common armature, whereby upon energization of either of the solenoids movement of the indented edge portions of the master film strip with respect to the said pair of switches the light intensity of the lamp will be varied, and means for synchronously moving the film copy strip below the master film strip.

2. In a film printing machine for reproducing film copy strip from a master film strip, a cabinet having a compartment, a lamp located in the compartment, the master film strip having a plurality of indented edge portions of predetermined length and re-occurrence, a pair of switches, one of the pair of switches located proximate to one edge of the master film strip and the other of the pair of switches located proximate to the other edge of the master film strip, means for moving the edge portions of the master film strip between the contacts of the said pair of switches, a pair of solenoids having a common armature, a rheostat connected in series with the lamp and having a movable contact connected to the said common armature, the first named switch connected to one of the pair of solenoids and the second named switch connected to the other of the pair of solenoids whereby either of the solenoids may be energized for a predetermined period of time according to the movement of the master film strip indented edge portions of the master film strip with respect to the contacts of the said pair of switches for gradually varying the light intensity of the lamp, and means for moving the film copy strip synchronously with the master film strip past the said lamp.

3. In a film printing machine for reproducing film copy strips from a master film strip, a cabinet, a plurality of compartments formed in the cabinet, a lamp located in each of the compartments, the master film strip having a plurality of indented edge portions of varying length and predetermined re-occurrence, a pair of switches located in each of the compartments, one of each of the pairs of switches located proximate to one edge portion of the master film strip and the other of each of the pairs of switches located proximate to the other edge portion of the said film strip, means for moving the edge portions of the master film strip between the contacts of each switch of the said pairs of switches, a plurality of pairs of solenoids, the first named switch of each of the pairs of switches connected in series with one of each of the pairs of solenoids and the second named switch of each of the pairs of switches connected in series with the other solenoid of each of the pairs of solenoids, each of the pairs of solenoids having a common armature, a plurality of rheostats, one of the plurality of rheostats connected in series with one of the said plurality of lamps, the movable contact of each of the rheostats being pivotally connected to the common armature of each of the pairs of solenoids, the movable contact being moved in either direction according to the contact period of one switch of each of the pairs of switches upon movement of the indented edge portions of the master film strip with respect to one of each of the said pairs of switches for graduating the light intensity of each of the lamps and means for synchronously moving the film copy strip below the master film strip.

4. In a multiple film printing machine comprising a cabinet having a plurality of printing compartments located therein, a lamp located in each of the printing compartments, a wall extending through the cabinet for supporting a master film strip, the master film strip having a plurality of indented edge portions of varying length and predetermined re-occurrence, a pair of switches located in each of the printing compartments, one contact of each of the said pair of switches being secured in the wall and insulated therefrom, the second contact of each of the said pair of switches being supported on the wall and adapted to ride on the edge portions of the master film strip, one of each of the said pair of switches being located proximate to one of the edge portions of the master film strip and the other switch of each of the said pair of switches located proximate to the other edge portion of the master film strip, means for moving the master film strip between the contacts of each of the said pair of switches, a rheostat connected in series with each of the printing lamps, a pair of solenoids having a common armature, the movable contact of the rheostat being connected to the common armature, the first named switch connected in series with one of the pair of solenoids and the second named switch being connected in series with the other of the pair of solenoids whereby either of the pair of solenoids may be energized for a predetermined period of time upon movement of the indented edge portions of the master film strip with respect to the pair of switches for gradually varying the light intensity of the printing lamps, and means for synchronously moving the film copy strip with the master film strip.

ROBERT C. WAGNER.